(12) United States Patent
Ping et al.

(10) Patent No.: US 8,571,517 B2
(45) Date of Patent: Oct. 29, 2013

(54) SYSTEM AND METHOD OF IDENTIFYING THE ASSOCIATION RELATIONSHIP BETWEEN A SMART CARD AND A MOBILE PHONE

(75) Inventors: Pan Ping, Beijing (CN); Yi Bo Zhang, Beijing (CN); Yan Feng Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 13/283,348

(22) Filed: Oct. 27, 2011

(65) Prior Publication Data

US 2012/0214548 A1 Aug. 23, 2012

(30) Foreign Application Priority Data

Oct. 29, 2010 (CN) .......................... 2010 1 0538301

(51) Int. Cl.
*H04M 11/00* (2006.01)
*H04K 3/00* (2006.01)
(52) U.S. Cl.
USPC .......................... 455/405; 455/456.3; 455/558
(58) Field of Classification Search
USPC .................... 455/405–406, 456.1, 456.3, 558
See application file for complete search history.

(56) References Cited

U.S. PATENT DOCUMENTS

| 6,989,765 | B2 | 1/2006 | Gueziec |
| 7,203,598 | B1 | 4/2007 | Whitsell |
| 7,479,901 | B2 | 1/2009 | Horstemeyer |
| 2004/0010446 | A1 | 1/2004 | Variska |
| 2004/0135704 | A1 | 7/2004 | Fischer |
| 2006/0189297 | A1 | 8/2006 | Jung |
| 2007/0061245 | A1 | 3/2007 | Jorey |
| 2009/0109058 | A1 | 4/2009 | Kim |
| 2010/0023246 | A1 | 1/2010 | Zhao |
| 2010/0151838 | A1 | 6/2010 | Wormald et al. |
| 2011/0125746 | A1* | 5/2011 | Leary et al. ................... 707/737 |

FOREIGN PATENT DOCUMENTS

WO 0248987 6/2002

OTHER PUBLICATIONS

Eriksson, "Location Based Destination Information for the Mobile Tourist", ICTT, Wien, Springer-Verlag, 2002.
Ferris, "OneBusAway: Results from Provising Real-Time Arrival Information for Public Transit", CHI 2010, Apr. 2010.
Tobeit, Location-Dependent & Value Added Services (VAS) for Mobile Communications.

* cited by examiner

*Primary Examiner* — Lee Nguyen
(74) *Attorney, Agent, or Firm* — Jennifer R. Davis; Anne VAchon Dougherty (57) ABSTRACT

A method and system for identifying an association between a Smart Card and a mobile device by selecting card-swiping record pairs from a set of card-swiping records of the Smart Card, each including a card-swiping location and a corresponding card-swiping time; calculating overlap degree in time and location dimensions of the card-swiping record pair and the communication behavior record pair of the mobile phone, which is recorded in a mobile network as a communication log; determining that the card-swiping record pair overlaps with the communication behavior record pair of the mobile phone recorded in the communication log if the overlap degree is greater than a predetermined threshold, and determining that the Smart Card is associated with the mobile phone if each card-swiping record pair of the plurality of card-swiping record pairs overlaps with the communication behavior record pair of the mobile phone recorded in the communication log.

9 Claims, 7 Drawing Sheets

SYSTEM AND METHOD OF IDENTIFYING THE ASSOCIATION RELATIONSHIP BETWEEN A SMART CARD AND A MOBILE PHONE

TECHNICAL FIELD

The present invention relates to a Smart Card system and a mobile phone system, and more particularly to an association analysis to the Smart Card and the mobile phone.

DESCRIPTION OF THE RELATED ART

Nowadays, more and more people tend to use a mobile phone and a Smart Card, which is a kind of magnetic card or RFID card like an all-in-one transportation card. In reality, although a Smart Card and a mobile phone are mostly used separately, for a particular subscriber, the Smart Card and the mobile phone that he uses can be associated with each other as they are held by the same subscriber.

Although each subscriber's Smart Card can be associated with his mobile phone, other people except the subscriber himself are not aware of such an association relationship. If there exists a system that can associate a Smart Card with a mobile phone, events that affect the subscriber of the Smart Card would be timely informed to the subscriber via the mobile phone. For example, if the bus that a Smart Card subscriber often takes is stuck in a heavy traffic jam, then, based on the travel pattern of the subscriber, a public service sector can inform him of the traffic situation via his mobile phone so as to help him to adjust the route accordingly. Besides, by utilizing the association relationship between the Smart Card and the mobile phone, a commercial organization can also analyze the subscriber's consumption habits by using the subscriber's Smart Card swiping records, so as to more accurately provide various services for customers via the mobile phone.

SUMMARY OF THE INVENTION

Although a mobile product integrating the functions of a Smart Card and a mobile phone is already available in the market, a majority of subscribers still use the Smart Card and the mobile phone separately. Therefore, a need exists to identify the association relationship between the Smart Card and the mobile phone.

To this end, in one aspect, the present invention provides a method of identifying the association relationship between a Smart Card and a mobile phone, which performs the following steps with respect to a given Smart Card and a mobile phone:

selecting a plurality of card-swiping record pairs from a set of card-swiping records of the Smart Card, wherein each card-swiping record of the plurality of card-swiping record pairs includes a card-swiping location and a corresponding card-swiping time;

performing the following steps with respect to each card-swiping record pair in the plurality of card-swiping record pairs:

calculating an overlap degree in time and location dimensions of the card-swiping record pair and a communication behavior record pair of the mobile phone recorded in a communication log of the mobile phone;

determining that the card-swiping record pair overlaps with the communication behavior record pair of the mobile phone recorded in the communication log if the overlap degree is greater than a predetermined threshold, determining that the Smart Card is associated with the mobile phone if each card-swiping record pair of the plurality of card-swiping record pairs overlaps with the communication behavior record pair of the mobile phone recorded in the communication log.

In another aspect, the present invention provides a system for identifying an association relationship between a Smart Card and a mobile phone, comprising: selecting means configured to select a plurality of card-swiping record pairs from a set of card-swiping records of the Smart Card, wherein each card-swiping record of the plurality of card-swiping record pairs includes a card-swiping location and a corresponding card-swiping time; calculating means configured to calculate an overlap degree in time and location dimensions of the card-swiping record pair and a communication behavior record pair of the mobile phone recorded in a communication log of the mobile phone; determining means configured to determine that the card-swiping record pair overlaps with the communication behavior record pair of the mobile phone recorded in the communication log if the overlap degree is greater than a predetermined threshold, and to determine that the Smart Card is associated with the mobile phone if each card-swiping record pair of the plurality of card-swiping record pairs overlaps with the communication behavior record pair of the mobile phone recorded in the communication log.

BRIEF DESCRIPTION OF THE DRAWINGS

Claims appended hereunder recite inventive features that are considered as characteristics of the present invention. However, the present invention itself and modes of use, additional objectives, features and advantages thereof can be more easily understood by referring to the accompanying drawings and reading the following detailed description of illustrative embodiments. In the drawings, FIG. 1 schematically illustrates a Smart Card-based electronic ticketing system;

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to one skilled in the art that implementation of the present invention may be practiced without these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes, and should not be construed as elements or limitations of the appended claims, unless otherwise explicitly specified in the claims.

Figure 1:
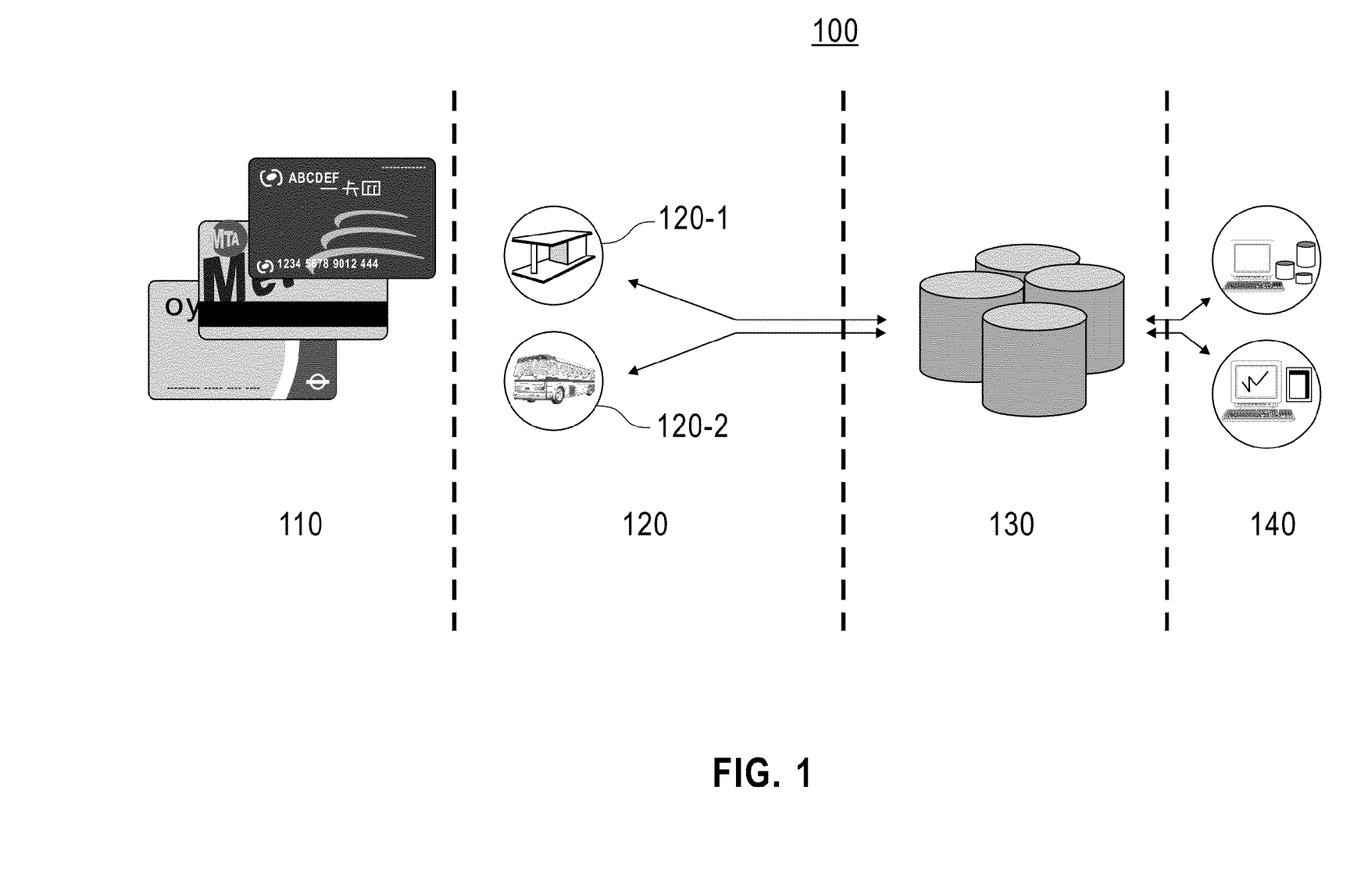

FIG. 1 schematically illustrates a Smart Card-based electronic ticketing system. The Smart Card system as illustrated in FIG. 1 comprises the following four parts: a Smart Card 110, a card reader 120, a data center 130 and a data processing system 140.

Hereinafter, the system 100, operating manners of the parts thereof, a method of record synchronization, and basic data for use in the association analysis of the present invention will be described.

tent in each piece of card-swiping record, the card-swiping information, namely, travel and/or consumption information, of the Smart Card holder within this period of time can be clearly reproduced.

For instance, Alice gets on the subway at Shangdi Station at 8:20 am on Sep. 5, 2010, then transfers to a bus to Beijing Normal University (BNU) and finally arrives at Beijing Normal University at 9:35 am. This process will generate card-swiping records that include the content as listed in Table 1 below.

It should be noted that the content and format of Table 1 are only for illustration purpose. For example, for convenience of description, natural language is used in Table 1 to describe operation categories and detailed information. Besides, those skilled in the art should appreciate that GIS information can be directly derived from the card-swiping records, or obtained by converting location information recorded in the card-swiping record.

TABLE 1

| Serial number | Card ID | Vehicle ID | Time Tag | Operation Category | Card-swiping Location/GIS information |
| --- | --- | --- | --- | --- | --- |
| 0001 | 1234567890 | 0013-027 (Line 13) | 2010/9/5 8:20 | enter the station | (40.0330, 116.3200) Shangdi Station |
| 0002 | 1234567890 | 0010-229 (Line 10) | 2010/9/5 8:50 | leave the station | (39.9765, 116.3699) Mudanyuan Station |
| 0003 | 1234567890 | 0690-014 (No. 690 Bus) | 2010/9/5 9:25 | Get on | (39.9765, 116.3699) Mudanyuan Station |
| 0004 | 1234567890 | 0690-014 (No. 690 Bus) | 2010/9/5 9:35 | Get off | (39.9586, 116.3706) BNU Bus Stop |

The Smart Card 110 is an electronic card held by a user, which is a kind of magnetic card or RFID card like an all-in-one card. In the Smart Card there are recorded a card ID, card-swiping information (namely, consumption records showing, e.g., information about consumption or getting on or off a bus at which place, at which moment, and/or on which day), account information (e.g., account balance) or the like.

The card reader 120 is for reading the information in the Smart Card 110, so as to form consumption records or card-swiping information according to actual situations, and to write related information (including the records and account balance) back to the Smart Card 110 while saving a copy of the consumption records in the card reader. Various card readers exist, for example, a fixed card-swiping system 120-1 located at subway stations, a mobile card-swiping system 102-2 mounted on a bus, or a card-swiping system (not shown) used at retailers and/or vending machines.

The data center 130 is for storing all consumption records and recharging records for future account checking and analysis. The data processing system 140 performs various data processing operations such as data cleaning according to the consumption records in the data center.

Each of the consumption records or card-swiping records in the data center 130 of the Smart Card system 100 includes at least the following items:

Smart Card ID; time tag (e.g., card-swiping time); card-swiping location (e.g., the location of getting on/off a bus); operation category (e.g., getting on or off a bus, or consumption); and other information (quantity of consumptions, account balance or the like).

In the case of acquiring a Smart Card ID, all card-swiping records of the Smart Card within a designated period of time may be queried through the data center. By viewing the content in each piece of card-swiping record, the card-swiping Table 2 shows a mobile phone network and its operating principle to exemplarily illustrate an event handling/update mechanism of the mobile phone network and positioning and Call Detail Record (CDR) of the mobile phone.

First, the concepts of Location Area and Cell are explained.

A mobile phone accesses a mobile network via a wireless base station (BS). During the call, all information of the mobile subscriber is transmitted via a mobile link including the base station.

To achieve frequency multiplexing, one base station usually covers a plurality of cellular areas which are called cells. Each cell covers an area with a radius from tens of meters to tens of kilometers.

A large mobile network generally includes tens of thousands of cells. In order to use and associate these base stations and cells conveniently and efficiently, the base stations and cells are divided into a plurality of location areas; each of the location areas includes a plurality of base stations and cells.

Figure 2:
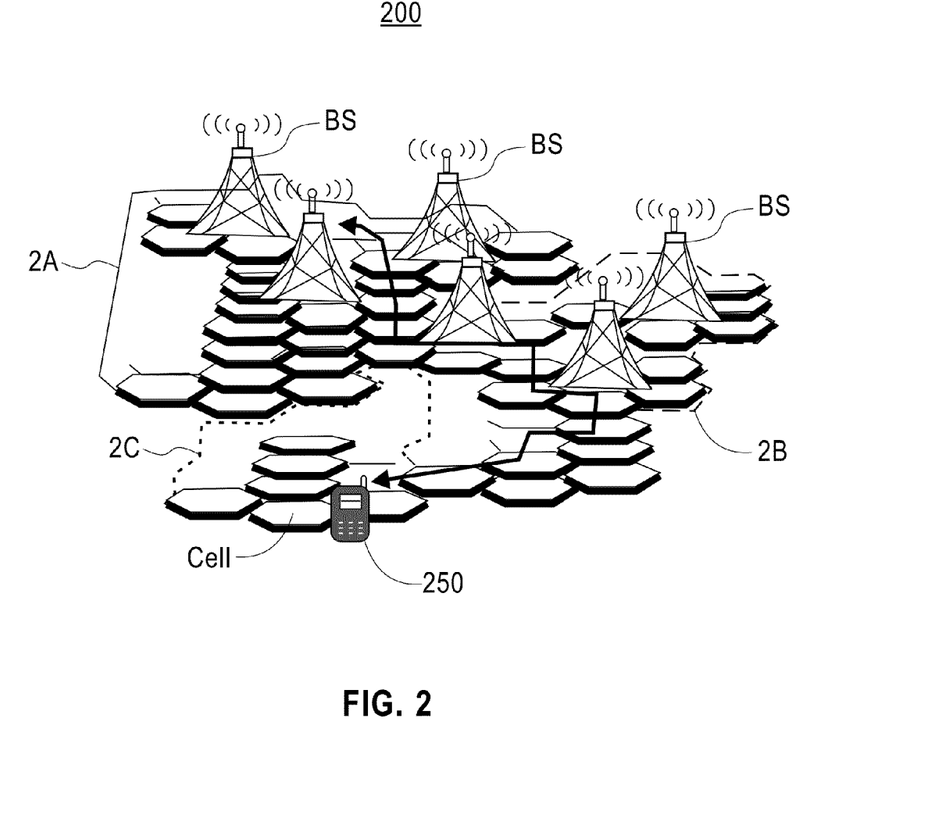
FIG. 2 schematically illustrates a mobile network and the operating principle thereof.

In the mobile network 200 as illustrated in FIG. 2, there are three location areas 2A, 2B and 2C; each of the location areas further includes a plurality of base stations BSs and cells.

A location area is uniquely identified by a location area code LAC, and a cell is uniquely identified by a Cell-ID. In the case of a clear context, "location area" sometimes represents "location area code", and vice versa; "cell" sometimes represents "Cell-ID", and vice versa.

As the mobile phone 250 moves in the mobile network 200, the cell and location area where the mobile phone is located vary over time. Each time the location area is updated, the overlap area between two neighboring location areas can be demarcated through the LAC1 before update and the LAC2 after update. If the subscriber's location area update information and the Cell-ID left during a call of the subscriber are known, the subscriber can be positioned using the known relationship in GIS dimension between the cell and the location area. For example, a cell covered by a base station No. AE4D is an area with the location P1 as the center and having a radius of 200 meters; if the current Cell-ID of the mobile phone subscriber is found to be changed to AE4D, it can be inferred that the subscriber approaches near the location P1.

The obtaining of the location area code LAC and Cell-ID is described as below.

As important communication information, a large number of location area codes LACs and Cell-IDs appear in a signaling of the mobile network:

Once the subscriber of the mobile phone 250 moving in the mobile network 200 enters into a new location area from a location area, the mobile phone 250 will automatically report to the mobile network 200 the location area update event, thereby obtaining the LAC before update and the LAC after update from the update event.

For a subscriber in a service (including during a call, during an on-line session, or during transmitting or receiving of a short message/multimedia message service/WAP), because its communication data includes the current Cell-ID, the Cell-ID can be obtained directly from the communication data.

The corresponding location area/cell information can be obtained from the signaling and data sent by the mobile phone 250. The signaling and data are recorded in the Call Detail Record (CDR) of the mobile phone as a part of a communication log of the mobile phone. The communication log of the mobile phone contains at least the following content:

International Mobile Subscriber Identity (IMSI), also called a mobile phone identity, which uniquely corresponds to the telephone number of the subscriber;

time tag, which represents the time when the behavior of the mobile phone occurs, for example, the time when a location area update occurs;

event category (location area update, signaling incoming/outbound, and the like);

detailed information (LAC before the location area update, LAC after the location area update, Cell-ID upon occurrence of a call/short message, and the like).

the serial number 0002 record, "Category" represents that the behavior of the mobile phone is a call communication, "ID" represents a Cell-ID, "Time Tag" represents that the time when the behavior occurs is 13:50 pm on Sep. 14, 2010, and "GIS information" indicates where the behavior occurs using GIS information.

Figure 3:
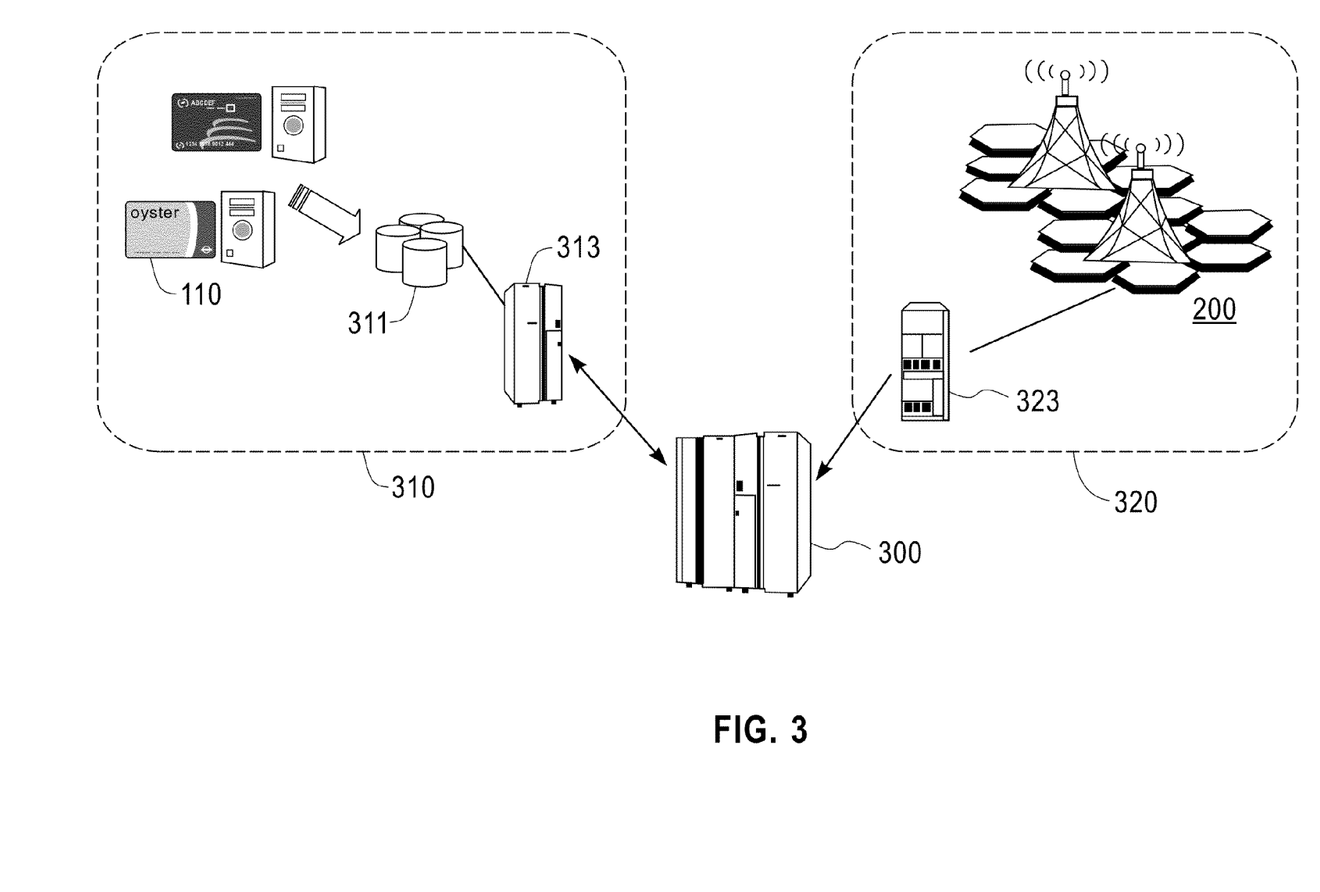
FIG. 3 is a schematic diagram showing the relationship between an association analysis system and a data source according to the present invention.

FIG. 3 is a schematic diagram illustrating the relationship between an association analysis system and a data source according to the present invention. FIG. 3 has three parts: an association analysis system 300, a Smart Card system (such as a bus card system) 310 and a mobile system (also called "mobile network") 320.

A Smart Card system and a mobile system maintain various data as required for their own management.

In the Smart Card system 310, card-swiping records or transaction records 311 of the Smart Card 110 are regularly uploaded into the data center 313. These data can be provided via an open service gateway (OSG) or in the form of a file.

In the mobile system 320, the behaviors of the mobile phone within the mobile network 200 include change of a location area, dial-in and dial-out, transmitting and receiving, which are submitted and stored in a mobile switching center 323 (MSC) in the form of a communication log or in the form of a file, or in another manner.

The association analysis system 300 of the present invention can directly use the data in the Smart Card system 310 and the mobile system 320, or can simply convert the data therein for use.

Hereinafter, a method of identifying the association relationship between a Smart Card and a mobile phone and its embodiments are described in detail with reference to FIG. 4.

A core technology adopted by the method of the present invention is time domain association analysis. The time domain association analysis identifies the association degree of Smart Card system records and mobile system records by analyzing the overlap degree in period of time dimension between the Smart Card system records and the mobile system records.

More specifically, by performing association analysis to the Smart Card transaction records and the mobile system CDR within different periods of time respectively, the asso-

TABLE 2

| Serial number | IMSI | Category | ID | Time Tag | GIS information |
|---|---|---|---|---|---|
| 0001 | 7893242132 | LAC | AEDC Shangdi District | 2010/9/14 11:20 | Polygonal Area Apex: (40.0482, 116.3000) (40.0570, 116.3227) (40.0369, 116.3364) (40.0258, 116.3366) (40.0203, 116.3157) (40.0346, 116.3066) |
| 0002 | 7893242132 | CELL | BFE2 Ito Yokado, Xizhimen | 2010/9/14 13:50 | Circular Area Center: (39.9379, 116.3462) Radius: 200 meters |

Table 2 schematically illustrates partial content of two records in the CDR of the mobile phone with an identity "7893242132". In the serial number 0001 record, "Category" represents that the behavior of the mobile phone is occurrence of a location area update, "ID" represents a location area code LAC, "Time Tag" indicates that the time when the behavior occurs is 11:20 am on Sep. 14, 2010; and "GIS information" indicates where the behavior occurs using GIS. Similarly, in ciation degrees of a given smart card and a given mobile phone within different periods of time (e.g., several days) are calculated and their association relationship is thus determined.

Figure 4:
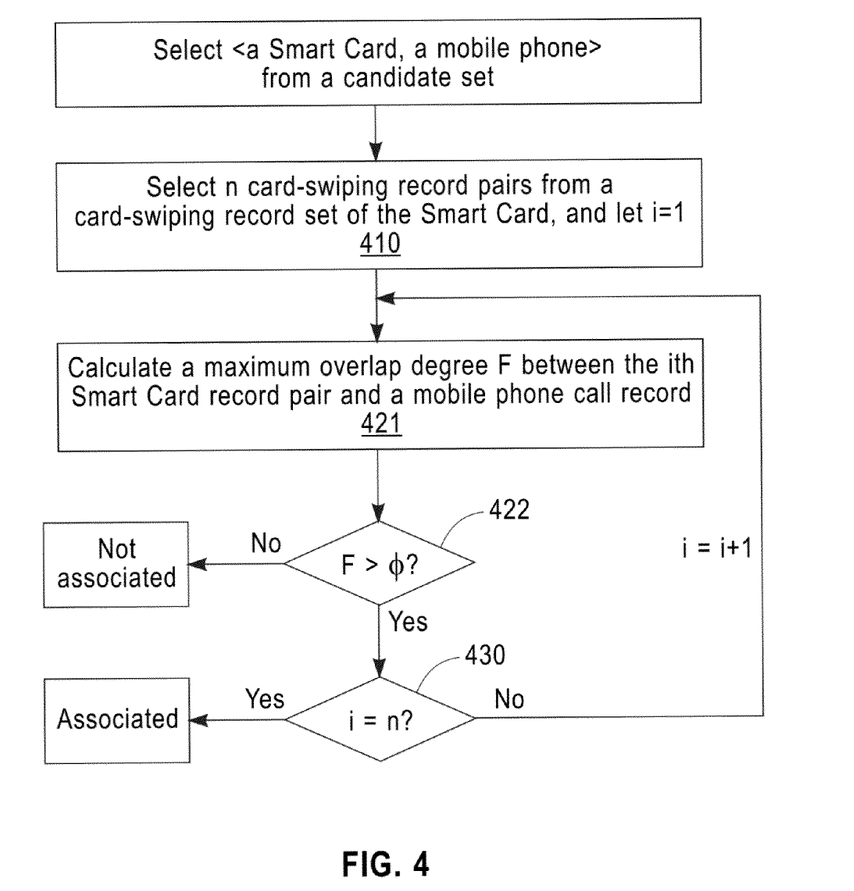
FIG. 4 is a schematic flowchart of a method of identifying the association relationship between a Smart Card and a mobile phone according to an embodiment of the present invention.

FIG. 4 is a schematic flowchart of the association analysis method according to one embodiment of the present invention. As illustrated in the figure, the method of identifying the association relationship between a Smart Card and a mobile phone according to the embodiment of the present invention comprises the following steps.

First, a pair of Smart Card and mobile phone is selected as a candidate Smart Card and a candidate mobile phone that are to be matched. Then, the following steps are performed.

In Step S410, a plurality of (n) card-swiping record pairs are selected from a set of card-swiping records of the Smart Card, wherein each card-swiping record in the plurality of card-swiping record pairs includes the card-swiping location and the corresponding card-swiping time.

Each card-swiping record pair in the Smart Card records includes two card-swiping records that record two card-swiping locations and corresponding card-swiping time, respectively, wherein the two card-swiping moments experience a same period of time. The two moments are preferably two consecutive moments in the set of card-swiping records. As above stated in combination with FIG. 3, a set of card-swiping records of a particular Smart Card can be obtained from the Smart Card system 310 based on the Smart Card ID, and one or more card-swiping records may be selected therefrom.

In Step S421, for each card-swiping record pair of the plurality of card-swiping record pairs, an overlap degree is calculated in time and location dimensions of the card-swiping record pair and a communication behavior record pair of the mobile phone recorded in a communication log of the mobile phone.

This step actually relates to comparing the Smart Card swiping records with the communication behavior records of the mobile phone by different periods of time, so as to determine the association relationship between the Smart Card and the mobile phone within each period of time.

In step S422, it is determined whether the overlap degree is greater than a predetermined threshold. If the overlap degree is greater than the predetermined threshold, it is determined that the card-swiping record pair overlaps with the communication behavior record pair of the mobile phone recorded in the communication log.

If the overlap degree is not greater than the predetermined threshold, it can be determined that the candidate Smart Card is not associated with the candidate mobile phone, then the analysis on whether the candidate Smart Card is associated with the candidate mobile phone ends.

In Step S430, it is determined whether each card-swiping record pair of the plurality of card-swiping record pairs overlaps with the communication behavior record pair of the mobile phone recorded in the communication log.

If yes, it can be determined that the candidate Smart Card is associated with the candidate mobile phone. Then, the analysis on whether the candidate Smart Card is associated with the candidate mobile phone ends.

Then, another pair of candidate Smart Card and candidate mobile phone can be selected for association analysis, with like process undertaken.

Step 410 of FIG. 4 preferably represents a selection of n card-swiping record pairs. According to one embodiment of the present invention, selecting a plurality of card-swiping record pairs from the set of card-swiping records of the Smart Card comprises selecting card-swiping record pairs with different card-swiping dates.

For example, the card-swiping date of the first card-swiping record pair is Jan. 31, 2010, the card-swiping date of the second card-swiping record pair is Jan. 30, 2010, and so on.

Selecting card-swiping record pairs with different card-swiping dates may improve the accuracy of association analysis. Furthermore, the larger the number of the selected card-swiping record pairs is, the higher is the accuracy. Generally speaking, a suitable amount of card-swiping record pairs may be determined empirically.

As stated in the previous introduction of the mobile system, the communication log of the mobile phone may include information regarding location area update of the mobile phone, as well as information regarding the cell information recorded in the communication situation. Therefore, step 410 can be executed in different ways when specifically implementing the present invention.

According to an embodiment of the present invention, an association analysis is conducted based on a location area update. Specifically speaking, the following steps may be performed to calculate an overlap degree in time and location dimensions of the card-swiping record pair and the communication behavior record pair of the mobile phone recorded in a communication log of the mobile phone at step S421:

Selecting from the communication log of the mobile phone a location area update record pair which geographically overlaps with the card-swiping record pair; and calculating the overlap degree in time dimension of the card-swiping record pair and the location area update record pair, to act as the overlap degree in time and location dimensions of the card-swiping record pair and the communication behavior record pair recorded in a communication log of the mobile phone.

Figure 5:
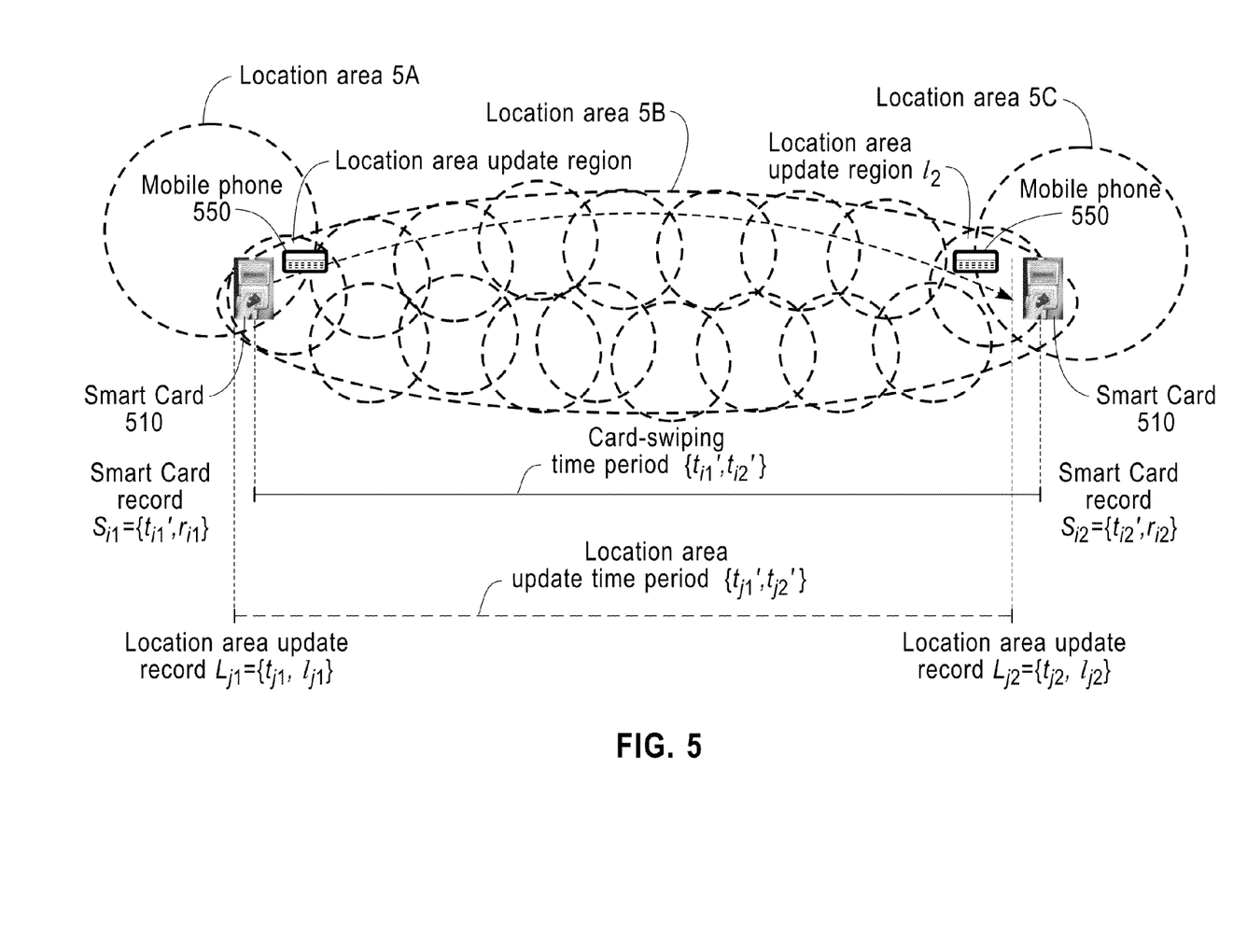
FIG. 5 is a schematic diagram of conducting an association analysis based on a location area update according to an embodiment of the present invention.

FIG. 5 is a schematic diagram of conducting an association analysis based on a location area update according to an embodiment of the present invention.

In FIG. 5, the $i^{th}$ card-swiping record in the Smart Card swiping records is denoted as $S_i=\{t_i', r_i\}$, wherein $t_i'$ represents the time of the $i^{th}$ card swiping, and $r_i$ represents the location of the $i^{th}$ card swiping. The card-swiping location information may be obtained from the card-swiping records as shown in Table 1.

The jth location area update record of the mobile phone in the mobile network is denoted as $L_j=\{t_j, l_j\}$, wherein $t_j$ represents the time of the $j^{th}$ location area update, and $l_j$ represents the location where the $j^{th}$ location area update occurs (namely, an overlap area of the location area before update and the location area after update).

FIG. 5 shows two card-swiping records $S_{i1}$ and $S_{i2}$, namely, a card swiping record pair $<S_{i1}, S_{i2}>$, which indicates that a subscriber holding a Smart Card corresponding to the card swiping record pair enters a subway station $r_{i1}$ by swiping the card at the time $t_{i1}'$ and swipes the card again to get out of another subway station $r_{i2}$ at the time $t_{i2}'$. FIG. 5 also shows two location area update records $L_{j1}$ and $L_{j2}$ in the communication log, which indicate that a mobile phone corresponding to the two location area update records is subject to a location area update at the location $l_{j1}$ at the time $t_{j1}$, and then subject to another location area update at the location $l_{j2}$ at the time $t_{j2}$.

The scenario as shown in FIG. 5 describes an event reflected by the card swiping record pair $<S_{i1}, S_{i2}>$ and the location area update record pair $<L_{j1}, L_{j2}>$. Intuitively, it is highly possible that the mobile phone 550 and the Smart Card 510 as illustrated in FIG. 5 have an association relationship, i.e., the subscriber of the mobile phone 550 is the subscriber of the Smart Card 510.

According to embodiments of the present invention, first, a location area update record pair is selected from the communication log of the mobile phone, and the location area update record pair geographically overlaps with the card-swiping record pair.

Generally, the association relationship between the card-swiping location $r_i$ and the occurrence location $l_j$ of the location area update may be defined by a corresponding function:

$$H(r_i, l_j) = \begin{cases} 1, & \text{wherein, } r_i \text{ and } l_j \text{ correspond} \\ & \text{to the same physical location,} \\ 0, & \text{wherein, } r_i \text{ and } l_j \text{ correspond} \\ & \text{to different physical locations.} \end{cases}$$

For the example in FIG. 5, the card-swiping location and the occurrence location of the location area update are located at the same geographic location. Therefore, the overlap degree in time dimension of the card-swiping record pair $\langle S_{i1}, S_{i2} \rangle$ and the location area update record pair $\langle L_{j1}, L_{j2} \rangle$ is calculated to measure the association degree of the card swiping records and the location area update records. The higher the overlap degree is, the greater the association degree is.

The overlap degree may be calculated with the following equation (1):

$$F(\langle S_{i1}, S_{i2} \rangle, \langle L_{j1}, L_{j2} \rangle) = \frac{\|\{t'_{i1}, t'_{i2}\} \cap \{t_{j1}, t_{j2}\}\|}{\|\{t'_{i1}, t'_{i2}\} \cup \{t_{j1}, t_{j2}\}\|} \quad (1)$$

Here, $\{t_{j1}, t_{j2}\}$ denotes a period of time from the time $t_{j1}$ to the time $t_{j2}$, a norm $\|\{x, y\}\|$ denotes a time difference from the time x to the time y, an intersection operation of the two periods of time (e.g., $\{t_{i1}', t_{i2}'\} \cap \{t_{j1}, t_{j2}\}$) denotes an overlap portion of the two periods of time, a union set operation of two periods of time(e.g., $\{t_{i1}', t_{i2}'\} \cup \{t_{j1}, t_{j2}\}$) denotes a total time occupied by the two periods of time, i.e., a sum of the lengths of the two periods of time minus the length of the overlap portion of the two periods of time. For example, $t_{i1}'$ is 9:10, $t_{i1}'$ is 9:30, and $\{t_{i1}', t_{i2}'\}$ denotes a period of time from 9:10 to 9:30. Similarly, $t_{j1}$ is 9:11, $t_{j2}$ is 9:32, and $\{t_{j1}, t_{j2}\}$ denotes a period of time from 9:11 to 9:32. Correspondingly, $\{t_{i1}', t_{i2}'\} \cap \{t_{j1}, t_{j2}\}$ denotes a period of time from 9:11 to 9:30, i.e., $\|\{t_{i1}', t_{i2}'\} \cap \{t_{j1}, t_{j2}\}\|=19$ minutes; $\{t_{i1}', t_{i2}'\} \cup \{t_{j1}, t_{j2}\}$ denotes a period of time from 9:10 to 9:32, $\|\{t_{i1}', t_{i2}'\} \cup \{t_{j1}, t_{j2}\}\|=22$ minutes, and thus $F(\langle S_{i1}, S_{i2} \rangle, \langle L_{j1}, L_{j2} \rangle)=19/22=0.86$.

It can be derived from the equation (1) that $$\frac{\|\{t'_{i1}, t'_{i2}\} \cap \{t_{j1}, t_{j2}\}\|}{\|\{t'_{i1}, t'_{i2}\} \cup \{t_{j1}, t_{j2}\}\|} = 0$$

if there is no overlap between the two periods of time;

$$\frac{\|\{t'_{i1}, t'_{i2}\} \cap \{t_{j1}, t_{j2}\}\|}{\|\{t'_{i1}, t'_{i2}\} \cup \{t_{j1}, t_{j2}\}\|} = 1$$

if the two periods of time overlap completely.

A condition for determining whether a card-swiping record is likely associated with a location area update record is:

$$F(\langle S_{i1}, S_{i2} \rangle, \langle L_{j1}, L_{j2} \rangle) > \phi$$

Herein, $\phi$ denotes a predetermined threshold, and $0 < \phi < 1$. The magnitude of $\phi$ determines the accuracy of association and how many associated pairs can be found. Apparently, the smaller $\phi$ is, the more Smart Card-mobile phone associated pairs can be found, but the lower the accuracy is, and correspondingly an erroneous association is likely to occur. On the contrary, the higher $\phi$ is, the higher the accuracy of the found associated pairs is, but the fewer associated pairs can be found. In an actual environment, the value of $\phi$ is further affected by the coverage of the location area and the cell, and a value range of $\phi$ in a typical urban environment is 0.6-0.9.

According to one embodiment of the present application, in the step S421 in the above method, the overlap degree in time dimension of the card-swiping record and the location area update record is calculated with the equation (1).

According to another embodiment of the present application, if the mobile phone conducts consecutive communication behaviors during the period of time between two card swipes, an association analysis to the Smart Card and the mobile phone can be performed according to time and location information generated during the call.

Specifically, the following procedure may be employed to calculate an overlap degree in time and location dimensions of the card-swiping record pair and the communication behavior record pair of the mobile phone recorded in a communication log of the mobile phone at step S421:

selecting from the communication log of the mobile phone a communication behavior record sequence that occurs between two card-swiping moments of the card-swiping record pair; based on the card swiping record pair, estimating the time when the mobile phone passes each cell in the communication behavior record sequence, calculating an average matching degree of the estimated time and an actual time when the candidate mobile phone conducts communication behaviors in the cells recorded in the communication behavior record sequence, as the overlap degree in time and location dimensions of the card-swiping record pair and the communication behavior record pair recorded in a communication log of the mobile phone.

Figure 6:
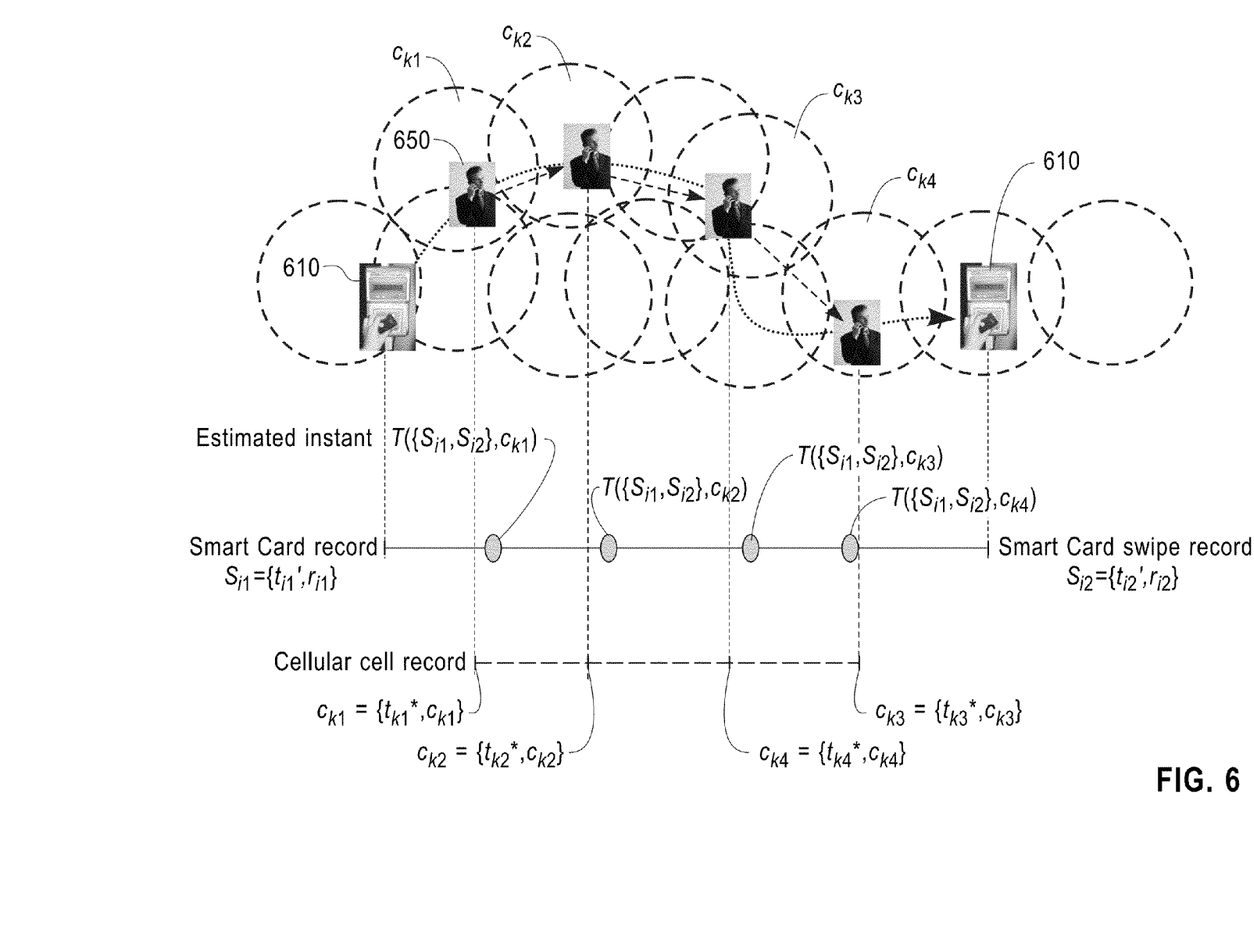
FIG. 6 is a schematic diagram of conducting an association analysis based on a mobile phone communication event according to an embodiment of the present invention.

This embodiment will be further described in combination with FIG. 6.

FIG. 6 is a schematic diagram of conducting an association analysis based on a communication event. The association scenario as shown in FIG. 6 is the direct association of the card-swiping record pair $\{S_{i1}, S_{i2}\}$ and a record sequence of a series of communication behaviors $\{C_{k1}, C_{k2}, \ldots, C_{kn}\}$ occurring between two card-swiping moments, 610. Herein, the kth communication behavior record in the mobile network is denoted as $C_k = \{t_k^*, c_k\}$, wherein $t_k^*$ denotes the occurrence time of the kth communication behavior, and $c_k$ denotes the cell where the subscriber is located when the communication behavior occurs.

Unlike the association scenario as shown in FIG. 5, the card-swiping location here is not directly associated with the location where the communication behavior occurs. Instead, the time when the subscriber passes the cell where he is located upon occurrence of the communication behavior is estimated in combination with the line along which the vehicle taken by the subscriber during the two card-swiping moments 610 (for example, getting on and off the bus), and the time is associated with the time recorded in the subscriber's communication records 650. Information about the number of the vehicle taken by the subscriber can be known by querying the vehicle ID in the card-swiping records, and the line along which the subscriber actually passes during the two card-swiping moments is obtained by querying the vehicle traveling line.

In FIG. 6, $T(\{S_{i1}, S_{i2}\}, c_k)$ denotes the estimated time when the subscriber passes through a given cell $c_k$ midway given a card-swiping record pair $\{S_{i1}, S_{i2}\}$. For convenience of expression, "estimated time" denotes the time when the subscriber passes a given cell estimated from the card-swiping records, and "actual time" denotes the time recorded in the mobile network when the subscriber conducts a communication behavior in the give cell.

Correspondingly, an association degree of the card-swiping record and the communication behavior record may be measured by an average matching degree of the estimated time and the actual time of the cells in the communication behavior record sequence. The closer the estimated time is to the actual time, the higher the association degree is.

The above average matching degree F. may be calculated with the equation (2):

$$F(\langle S_{i1}, S_{i2} \rangle, \langle C_{k1}, C_{k2}, \ldots, C_{kn} \rangle) = \frac{1}{n-1} \quad (2)$$

$$\sum_{m=1,2,\ldots,n-1} \frac{\|\{T(\{S_{i1}, S_{i2}\}, c_{km}), T(\{S_{i1}, S_{i2}\}, c_{k,m+1})\} \cap \{t^*_{km}, t^*_{k,m+1}\}\|}{\|\{T(\{S_{i1}, S_{i2}\}, c_{km}), T(\{S_{i1}, S_{i2}\}, c_{k,m+1})\} \cup \{t^*_{km}, t^*_{k,m+1}\}\|}$$

wherein, operation symbols in the equation (2) have same meanings as in equation (1), i.e., "∩" denotes an overlapping portion of two periods of time, "∪" denotes a total time occupied by two periods of time, a norm "$\|\{x,y\}\|$" denotes a time difference from the moment x to the moment y. For example, a Smart Card swiping record pair $\{S_{i1}, S_{i2}\}$ indicates that the subscriber of the Smart Card gets on the No. 375 bus route at the Xizhimen stop at 9:00 am, gets off at the Wudaokou stop at 9:45 am, and between 9:00 am-9:45 am, the mobile phone generates three communication behavior records $\{C_{k1}, C_{k2}, C_{k3}\}$ in which each cell is in the route of the No. 375 bus from Xizhimen to Wudaokou. According to a routine running speed of the No. 375 bus, the time when the No. 375 bus passes through the three cells in the mobile communication behavior records may be estimated to be 9:15 am, 9:20 am and 9:35 am, respectively. However, the actual time distributions in the communication behavior records are respectively 9:16 am, 9:19 am and 9:34 am, and then the average matching degree may be derived from the equation (2):

$$F(\langle S_{i1}, S_{i2} \rangle \langle C_{k1}, C_{k2}, \ldots, C_{kn} \rangle) = \frac{1}{2}(\frac{3}{5} + \frac{14}{16}) = 0.7375$$

A condition for determining whether a card-swiping record is likely associated with a communication behavior record is:

$$F(\{S_{i1}, S_{i2}\}, \{C_{k1}, C_{k2}, \ldots, C_{kn}\}) > \phi$$

Herein, φ denotes a predetermined threshold, and 0<φ<1. The physical meaning of φ is analogous to the φ as described above in combination with FIG. 5. Specific values of φ and φ can be different and depend on the size of the area covered by the communication cell and the size of the area covered by the location area update region, respectively. The larger the area of the communication cell is, the larger the error tolerance range of association of the card-swiping records and the communication behavior records becomes, and accordingly the smaller the value of φ should be. Similarly, the larger the area of the location area update region is, the larger the error tolerance range of association of the card-swiping records and the location area update records becomes, and accordingly the smaller the value of φ should be. In actual environment, a value range of φ in a typical urban environment is 0.6-0.9.

According to an embodiment of the present application, in the step S421 of the above method, equation (2) is employed to calculate an average matching degree of the estimated time of the cells in the communication behavior record sequence and the actual time when the subscriber conducts communication behaviors in the cells.

Various embodiments of the method of identifying the association relationship between a Smart Card and a mobile phone as described above are a process of conducting an association analysis to a pair of Smart Card and mobile phone as objects to be matched.

According to one embodiment of the present invention, when specifically implementing various embodiments of the method of identifying the association relationship between the Smart Card and the mobile phone as described above, a pair of a Smart Card and a mobile phone can be selected from a set of predetermined candidate matches. The selected pair of Smart Card and mobile phone is considered as a candidate Smart Card and a candidate mobile phone to be matched. The set of candidate matches includes a plurality of two-tuples; each two-tuple represents a Smart Card and a mobile phone.

It can be identified whether each pair of Smart Card and mobile phone is associated with each other by conducting an association analysis to each pair of Smart Card and mobile phone in the set of predetermined candidates according to the method of the present invention; thereby generating an associated set formed by the associated Smart Card-mobile phone pair.

The set of candidate matches can be obtained in various manners. For example, the set of candidate matches can be obtained by simply pairing a Smart Card often conducting card-swiping behaviors within a certain geographic area and a mobile phone having communication behaviors within the same geographic area. According to one embodiment of the present invention, the set of candidate matches can be obtained by conducting the regional association of the Smart Card and the mobile phone. Specifically, a set of candidate matches may be generated by the following steps:

For each Smart Card in a given scope, the card-swiping records of the Smart Card are compared with the communication behavior records of each mobile phone in the given scope. If the card swiping behavior of the Smart Card and the communication behavior of the mobile phone occur at the same geographic location at the same moment, the two-tuple formed by the Smart Card ID and the mobile phone ID is placed in the set of candidate matches.

According to embodiments of the present invention, for the Smart Card and the mobile phone in each two-tuple of the set of candidate matches, if the card swiping behavior of the Smart Card and the communication behavior of the mobile phone occur at different geographic locations at the same moment, the two-tuple is deleted from the set of candidate matches.

The set of candidate matches is generated out of the following considerations: if the card swiping behavior of the Smart Card and the communication behavior of the mobile phone occur at a same location at the same moment, the Smart Card is likely associated with the mobile phone; and if the card swiping behavior of the Smart Card and the communication behavior of the mobile phone occur at different locations at the same moment, it is impossible to associate the Smart Card with the mobile phone. Therefore, the thus-generated set of candidate matches is a preliminary screening result to the Smart Cards and the mobile phones to be matched, wherein the card-swiping records and communication behavior records of each pair of Smart Card and mobile phone are identical or close in terms of occurrence sites. The calculation complexity for association analysis can be obviously decreased by using such a set of candidate matches for fine-granular association analysis.

The method of identifying the association relationship between a Smart Card and a mobile phone according to the present invention has been described with reference to the embodiments. According to the same inventive concept, the present invention also provides a system for identifying the association relationship between a Smart Card and a mobile phone.

Figure 7:
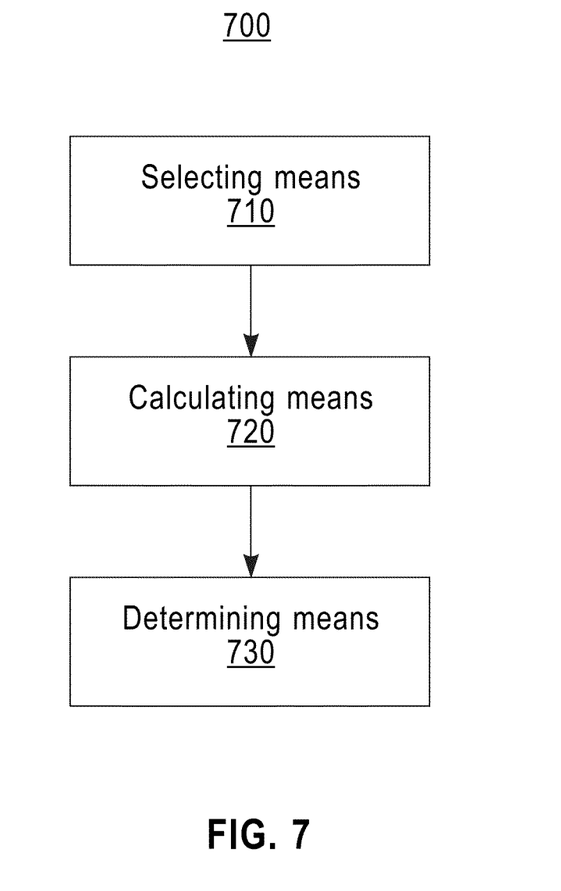
FIG. 7 is a simple block diagram illustrating a system of identifying the association relationship between a Smart Card and a mobile phone according to an embodiment of the present invention.

As shown in FIG. 7, the system 700 for identifying the association relationship between a Smart Card and a mobile phone comprises a selecting component 710, a calculating component 720 and a determining component 730, each of which includes or is implemented by a processing device.

For a given Smart Card and a given mobile phone, the selecting means 710 is configured to select a plurality of card-swiping record pairs from a set of card-swiping records of the Smart Card, wherein each card-swiping record in the plurality of card-swiping record pairs comprises a card-swiping location and a corresponding card-swiping time.

The calculating means 720 is adapted to calculate an overlap degree in time and location dimensions of the card-swiping record pair selected by the selecting means 710 and the communication behavior record pair of the mobile phone recorded in a communication log of the mobile phone.

The determining means 730 is adapted to determine whether the card-swiping record pair overlaps with the communication behavior record pair of the mobile phone recorded in the communication log, thereby determining whether the Smart Card is associated with the mobile phone. Specifically speaking, if the overlap degree calculated by the calculating means 720 is greater than a predetermined threshold, then the determining means 730 will determine that the card-swiping record pair overlaps with the communication behavior record pair of the mobile phone recorded in the communication log. If each card-swiping record pair in the plurality of card-swiping record pairs overlaps with the mobile phone communication behaviors record pairs as recorded in the communication log of the mobile phone, the determining means will determine that the Smart Card is associated with the mobile phone.

According to an embodiment of the present invention, the selecting means 710 is configured to select card-swiping record pairs with different card-swiping dates from the set of card-swiping records of the Smart Card.

According to an embodiment of the present invention, the calculating means 720 is configured to select from the communication log of the mobile phone a location area update record pair which geographically overlaps with the card-swiping record pair; calculate an overlap degree in time dimension of the card-swiping record pair and the location area update record pair, as the overlap degree in time and location dimensions of the card-swiping record pair and the communication behavior record pair recorded in the communication log of the mobile phone.

According to an embodiment of the present invention, the calculating means 720 calculates the overlap degree in time dimension of the card-swiping record pair and the location area update record pair with the equation (1) stated above.

According to an embodiment of the present invention, the calculating means 720 is configured to select from the communication log of the mobile phone a communication behavior record sequence which occurs between two card-swiping moments of the card-swiping record pair; estimate a moment when the mobile phone passes each cell in the communication behavior record sequence based on the card swiping record pair, calculate an average matching degree of the estimated moment and an actual moment when the mobile phone conducts communication behaviors in each cell, as the overlap degree in time and location dimensions of the card-swiping record pair and the communication behavior record pair of the mobile phone recorded in the communication log.

According to one embodiment of the present invention, the calculating means 720 calculates the average matching degree of the estimated moments of the cells in the communication behavior record sequence and actual moments when the mobile phone conducts communication behaviors in the cells by employing the equation (2) stated above.

According to one embodiment of the present invention, the Smart Card and the mobile phone are obtained from a set of predetermined candidate matches, and the set of candidate matches includes a plurality of two-tuples; each of the two-tuple represents a Smart Card and a mobile phone.

The system according to one embodiment of the present invention further comprises candidate match set generating means (not shown in the figure). For each Smart Card in a given scope, the candidate match set generating means compares the card-swiping records of the Smart Card with the communication behavior records of each mobile phone in the given scope. If the card swiping behavior of the Smart Card and the communication behavior of the mobile phone occur at the same geographic location at one moment, then the two-tuple formed by the Smart Card ID and the mobile phone ID is placed in the set of candidate matches.

According to one embodiment of the present invention, for the Smart Card and the mobile phone in each two-tuple of the set of candidate matches, if the card swiping behavior of the Smart Card and the communication behavior of the mobile phone occur at different geographic locations at the same moment, the candidate match set generating means deletes the two-tuple from the set of candidate matches.

The above has described the embodiments of the present invention. It should be noted that the above depiction is only exemplary, not intended for limiting the present invention. In other embodiments of the present invention, the method may have more, or less, or different steps, and numbering the steps is only for making the depiction more concise and much clearer, but not for stringently limiting the sequence between each steps, and the sequence of steps may be different from the depiction. For example, in some embodiments, the above one or more optional steps may be omitted. Specific embodiment of each step may be different from the depiction. All these variations fall within the spirit and scope of the present invention.

The present invention may be implemented by hardware or a combination of hardware and software. The present invention may be implemented in a computer system in a collective or distributive manner, where in the distributed manner, different parts are distributed in a plurality of interconnected computer systems. Any computer system or other apparatus suitable for implementing the method as depicted herein is suitable. A typical combination of hardware and software may be a universal computer system having at least one processing device and a computer program which, when being loaded and executed, controls the computer system to implement the method of the present invention and constitute the apparatus of the present invention.

The present invention may also be stored in a computer program product which comprises all features capable of implementing the method as depicted herein and may implement the method when loaded to the computer system. The present invention has been specifically illustrated and explained with reference to the preferred embodiments. Those skilled in the art should understand various changes thereto in form and details may be made without departing from the spirit and scope of the present invention.

What is claimed is:

1. A system of identifying the association relationship between a Smart Card and a mobile phone, comprising:

at least one processing device for executing components;
a selecting component configured to select a plurality of card-swiping record pairs from a set of card-swiping records of a Smart Card, wherein each card-swiping record of the plurality of card-swiping record pairs includes a card-swiping location and a corresponding card-swiping time;
a calculating component configured to calculate an overlap degree in time and location dimensions of the card-swiping record pair and a communication behavior record pair of a mobile phone recorded in a communication log of the mobile phone;
a determining component configured to determine that the card-swiping record pair overlaps with the communication behavior record pair of the mobile phone recorded in the communication log if the overlap degree is greater than a predetermined threshold, and to determine that the Smart Card is associated with the mobile phone if each card-swiping record pair of the plurality of card-swiping record pairs overlaps with the communication behavior record pair of the mobile phone recorded in the communication log.

2. The system according to claim 1, wherein the selecting means is configured to select card-swiping record pairs with different card-swiping dates from the set of card-swiping records of the Smart Card.

3. The system according to claim 2, wherein the calculating component is configured to:
select from the communication log of the mobile phone a location area update record pair which geographically overlaps with the card-swiping record pair;
calculate an overlap degree in time dimension of the card-swiping record pair and the location area update record pair, as the overlap degree in time and location dimensions of the card-swiping record pair and the communication behavior record pair of the mobile phone recorded in the communication log.

4. The system according to claim 3, wherein the calculating component is configured to calculate the overlap degree F. in time dimension of the card-swiping record pair and the location area update record pair as below:

$$F(\langle S_{i1}, S_{i2}\rangle, \langle L_{j1}, L_{j2}\rangle) = \frac{\|\{t'_{i1}, t'_{i2}\} \cap \{t_{j1}, t_{j2}\}\|}{\|\{t'_{i1}, t'_{i2}\} \cup \{t_{j1}, t_{j2}\}\|}$$

wherein, $\{S_{i1}, S_{i2}\}$ denotes the card-swiping record pair of the Smart Card, $\{C_{k1}, C_{k2}, \ldots, C_{kn}\}$ denotes the communication behavior record sequence occurring between the two card-swiping moments, $C_k=\{t_k^*, c_k\}$ denotes the kth communication behavior record in a mobile network, wherein $t_k^*$ denotes an actual moment of occurrence of the kth communication behavior, $c_k$ denotes a cell where the mobile phone is located upon occurrence of the communication action, $T(\{S_{i1}, S_{i2}\}, c_k)$ denotes the estimated moment when the mobile phone passes through a given cell $c_k$ midway given the card-swiping record pair $\{S_{i1}, S_{i2}\}$, $\{T(\{S_{i1}, S_{i2}\}, c_{km}), T(\{S_{i1}, S_{i2}\}, c_{k,m+1})\}$ denotes a period of time between two estimated moments, $\{t_{km}^*, t_{k,m+1}^*\}$ denotes a period of time between two actual moments, $\|\{T(\{S_{i1}, S_{i2}\}, c_{km}), T(\{S_{i1}, S_{i2}\}, c_{k,m+1})\} \cap \{t_{km}^*, t_{k,m+1}^*\}\|$ denotes an overlapped time length of the two periods of time, and $\|\{T(\{S_{i1}, S_{i2}\}, c_{km}), T(\{S_{i1}, S_{i2}\}, c_{k,m+1})\} \cup \{t_{km}^*, t_{k,m+1}^*\}\|$ denotes a total time length of the two periods of time.

5. The system according to claim 3, wherein the calculating means is configured to calculate the average matching degree of the estimated moment of each cell in the communication behavior record sequence and the actual moment when the subscriber conducts the communication behavior in each cell as below:

$$F(\langle S_{i1}, S_{i2}\rangle, \langle C_{k1}, C_{k2}, \ldots, C_{kn}\rangle) = \frac{1}{n-1} \sum_{m=1,2,\ldots,n-1} \frac{\|\{T(\{S_{i1}, S_{i2}\}, c_{km}), T(\{S_{i1}, S_{i2}\}, c_{k,m+1})\} \cap \{t_{km}^*, t_{k,m+1}^*\}\|}{\|\{T(\{S_{i1}, S_{i2}\}, c_{km}), T(\{S_{i1}, S_{i2}\}, c_{k,m+1})\} \cup \{t_{km}^*, t_{k,m+1}^*\}\|}$$

wherein, $\{S_{i1}, S_{i2}\}$ denotes the card-swiping record pair of the Smart Card, $\{C_{k1}, C_{k2}, \ldots, C_{kn}\}$ denotes the communication behavior record sequence occurring between the two card-swiping moments, $C_k=\{t_k^*, c_k\}$ denotes a kth communication behavior record in a mobile network, wherein $t_k^*$ denotes an actual moment of occurrence of the kth communication behavior, $c_k$ denotes a cell where the mobile phone is located upon occurrence of the communication behavior, and $T(\{S_{i1}, S_{i2}\}, c_k)$ denotes an estimated moment when the mobile phone passes through a given cell $c_k$ midway during a given card-swiping record pair $\{S_{i1}, S_{i2}\}$.

6. The system according to claim 2, wherein the calculating component is configured to:
select from the communication log of the mobile phone a communication behavior record sequence that occurs between two card-swiping moments of the card-swiping record pair;
estimate a moment when the mobile phone passes by each cell in the communication behavior record sequence based on the card-swiping record pair, calculate an average matching degree of the estimated moment and an actual moment when a subscriber conducts the communication behavior in each cell, as the overlap degree in time and location dimensions of the card-swiping record pair and the communication behavior record pair of the mobile phone recorded in the communication log.

7. The system according to claim 1, wherein, the Smart Card and the mobile phone are obtained from a set of predetermined candidate matches, and the set of candidate matches includes a plurality of two-tuples, each of the two-tuples denotes a Smart Card and a mobile phone.

8. The system according to claim 7, further comprising a candidate match set generating means, wherein for each Smart Card in a given scope, the candidate match set generating means is configured to compare the card-swiping records of the Smart Card with the communication behavior records of each mobile phone in the given scope; if the card swipe behavior of the Smart Card and the communication behavior of the mobile phone occur at a same geographic location at a moment, a two-tuple formed by the Smart Card ID and the mobile phone ID is placed in the set of candidate matches.

9. The system according to claim 8, wherein for the Smart Card and the mobile phone in each two-tuple of the set of candidate matches, if the card swipe behavior of the Smart Card and the communication behavior of the mobile phone occur at different geographic locations at a moment, the two-tuple is deleted from the set of candidate matches.

* * * * *